United States Patent
Iyer et al.

(10) Patent No.: US 11,947,548 B2
(45) Date of Patent: Apr. 2, 2024

(54) SYSTEMS AND METHODS FOR PROVIDING SEARCH RESULTS BASED ON A PRIMARY INTENT

(71) Applicant: Walmart Apollo, LLC, Bentonville, AR (US)

(72) Inventors: Rahul Radhakrishnan Iyer, Sunnyvale, CA (US); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 64 days.

(21) Appl. No.: 17/456,733

(22) Filed: Nov. 29, 2021

(65) Prior Publication Data

US 2023/0169080 A1 Jun. 1, 2023

(51) Int. Cl.
*G06F 16/2457* (2019.01)
*G06F 16/242* (2019.01)
(Continued)

(52) U.S. Cl.
CPC ...... *G06F 16/24575* (2019.01); *G06F 16/243* (2019.01); *G06N 3/044* (2023.01); *G06N 3/08* (2013.01); *G06Q 30/0625* (2013.01)

(58) Field of Classification Search
CPC . G06F 16/24575; G06F 16/243; G06N 3/044; G06N 3/08; G06Q 30/0625
See application file for complete search history.

(56) References Cited

U.S. PATENT DOCUMENTS 8,832,079 B2 * 9/2014 Malec ................. G06F 16/3322
707/750
9,934,306 B2 4/2018 Subramanian et al.
(Continued)

FOREIGN PATENT DOCUMENTS

CN 111125538 A 5/2020

OTHER PUBLICATIONS

Luo, et al., "Central Intention Identification for Natural Language Search Query in E-Commerce" SIGIR 2018 eCom, Jul. 2018, Ann Arbor, Michigan, USA.
(Continued)

*Primary Examiner* — Richard L Bowen
*Assistant Examiner* — Aryan D Toughiry
(74) *Attorney, Agent, or Firm* — Morgan, Lewis & Bockius LLP; Manita Rawat

(57) ABSTRACT

This application relates to systems and methods for providing search results based on a primary intent. In some examples, a disclosed system includes a memory resource storing instructions; and one or more processors coupled to the memory resource. The one or more processors are configured to execute the instructions to: receive, from a user, a search query including a plurality of words, identify a plurality of intention terms from the words of the search query, compute, for each of the plurality of intention terms, a compatibility score between the intention term and a query context associated with the intention term, determine, from the plurality of intention terms, a primary intention term having a maximum compatibility score among the plurality of intention terms, and generate, based on the primary intention term, a set of intent-based search results in response to the search query, the set of intent-based search results identifying a set of items associated with the primary intention term.

20 Claims, 9 Drawing Sheets

(51) Int. Cl.
*G06N 3/044* (2023.01)
*G06N 3/08* (2023.01)
*G06Q 30/0601* (2023.01)

(56) References Cited

U.S. PATENT DOCUMENTS

| | | | |
|---|---|---|---|
| 10,803,255 B2 | 10/2020 | Dubyak et al. | |
| 2017/0011742 A1* | 1/2017 | Jing | G10L 15/22 |
| 2018/0276726 A1* | 9/2018 | Siddiqui | G06Q 30/0603 |
| 2020/0035244 A1* | 1/2020 | Kim | G06N 3/08 |
| 2022/0107802 A1* | 4/2022 | Rao | G06F 16/907 |
| 2022/0147515 A1* | 5/2022 | Nair | G06F 16/26 |
| 2022/0180056 A1* | 6/2022 | Hong | G06N 20/00 |
| 2022/0292262 A1* | 9/2022 | Japa | G06F 16/90332 |

OTHER PUBLICATIONS

Majumder, et al., "Deep Recurrent Neural Networks for Product Attribute Extraction in eCommerce", Mar. 2018, arXiv:1803.11284, 7 pages.

Jiang, et al., "End-to-End Product Taxonomy Extension from Text Reviews", 2019 IEEE 13th International Conference on Semantic Computing (ICSC), 2019, pp. 195-198.

Ma, et al., "End-to-end Sequence Labeling via Bi-directional LSTM-CNNs-CRF", Proceedings of the 54th Annual Meeting of the Association for Computational Linguistics, Berlin, Germany, Aug. 7-12, 2016, pp. 1064-1074.

Cheng, et al., "Extracting Attributes for Recommender Systems Based on MEC Theory", 2018 3rd International Conference on Computer and Communication Systems (ICCCS), 2018, pp. 125-129.

Sun, et al., "Important Attribute Identification in Knowledge Graph", Oct. 2018, arXiv:1810.05320, 13 pages.

Zheng, et al., "OpenTag: Open Attribute Value Extraction from Product Profiles" KDD '18: Proceedings of the 24th ACM SIGKDD International Conference on Knowledge Discovery & Data Mining, Jul. 2018, pp. 1049-1058.

Cardoso, et al., "Product Characterisation towards Personalisation Learning Attributes from Unstructured Data to Recommend Fashion Products", KDD '18: Proceedings of the 24th ACM SIGKDD International Conference on Knowledge Discovery & Data Mining, Jul. 2018, pp. 80-89.

Sawant, et al., "Product discovery from E-commerce listings via deep text parsing", CoDS-COMAD '18: Proceedings of the ACM India Joint International Conference on Data Science and Management of Data, Jan. 2018, pp. 98-107.

Nobari, et al., "Query Understanding via Entity Attribute Identification", CIKM '18: Proceedings of the 27th ACM International Conference on Information and Knowledge Management, Oct. 2018, pp. 1759-1762.

Bing, et al., "Unsupervised extraction of popular product attributes from E-commerceWeb sites by considering customer reviews", ACM Trans. Internet Technol. 16, 2, Article 12, Apr. 2016, 17 pages.

* cited by examiner

SYSTEMS AND METHODS FOR PROVIDING SEARCH RESULTS BASED ON A PRIMARY INTENT

TECHNICAL FIELD

The disclosure relates generally to online search and, more specifically, to providing search results based on a primary intent.

BACKGROUND

A user can search for items online, e.g. through a website or a mobile app. For example, the website or app may include a search bar that allows the user to enter a search query, such as one or more words, and display search results determined by a search algorithm based on the search query. When the website or app is associated with a retailer, the search results may identify items that are offered for purchase by the retailer.

Existing search engines are able to understand and provide relevant results to keywords-based search queries. These search results based on keywords can have drawbacks. First, compared to keywords, natural language based query is a more comfortable way for people to go online shopping because people communicate with each other using natural language in daily life. In addition, more and more users start to use voice interactions or inputs to generate a search query, which is often based on natural language like speeches of the users. While a query, e.g. a query based on natural language, may include multiple keywords reflecting multiple intents of a user, an existing search engine does not consider these intents with correct attentions. For example, the search results of an existing search engine may include items that do not correspond to the real intent of the person conducting the search. In other examples, items that a person would be interested in may appear lower in the search results, which can cost the person significant time to ignore irrelevant search results before viewing relevant search results.

As such, existing methods to provide search results, such as those in response to a search query for an item sold by a retailer, are not entirely satisfactory.

SUMMARY

The embodiments described herein are directed to providing search results based on a primary intent of a user. While a search query based on natural language may have multiple intents, a disclosed system can identify the primary intent from the multiple intents, which can help providing search results better matching the user's real intent and help decreasing frictions of user interactions with voice assistants for searching. An attention mechanism may be used to generate different weights for different pairs of intention term and query context to better understand the query's primary intent. User preferences and user features may also be used to generate personalized search results based on the primary intent.

In accordance with various embodiments, exemplary systems may be implemented in any suitable hardware or hardware and software, such as in any suitable computing device.

In some embodiments, a disclosed system for providing search results includes a memory resource storing instructions; and one or more processors coupled to the memory resource. The one or more processors are configured to execute the instructions to: receive, from a user, a search query including a plurality of words, identify a plurality of intention terms from the words of the search query, compute, for each of the plurality of intention terms, a compatibility score between the intention term and a query context associated with the intention term, determine, from the plurality of intention terms, a primary intention term having a maximum compatibility score among the plurality of intention terms, and generate, based on the primary intention term, a set of intent-based search results in response to the search query, the set of intent-based search results identifying a set of items associated with the primary intention term.

In other embodiments, a method is provided for providing search results. The method includes: receiving, from a user, a search query including a plurality of words; identifying a plurality of intention terms from the words of the search query; computing, for each of the plurality of intention terms, a compatibility score between the intention term and a query context associated with the intention term; determining, from the plurality of intention terms, a primary intention term having a maximum compatibility score among the plurality of intention terms; and generating, based on the primary intention term, a set of intent-based search results in response to the search query, the set of intent-based search results identifying a set of items associated with the primary intention term.

In yet other embodiments, a non-transitory computer readable medium having instructions stored thereon is provided. The instructions, when executed by at least one processor, cause a device to perform operations comprising: receiving, from a user, a search query including a plurality of words; identifying a plurality of intention terms from the words of the search query; computing, for each of the plurality of intention terms, a compatibility score between the intention term and a query context associated with the intention term; determining, from the plurality of intention terms, a primary intention term having a maximum compatibility score among the plurality of intention terms; and generating, based on the primary intention term, a set of intent-based search results in response to the search query, the set of intent-based search results identifying a set of items associated with the primary intention term.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
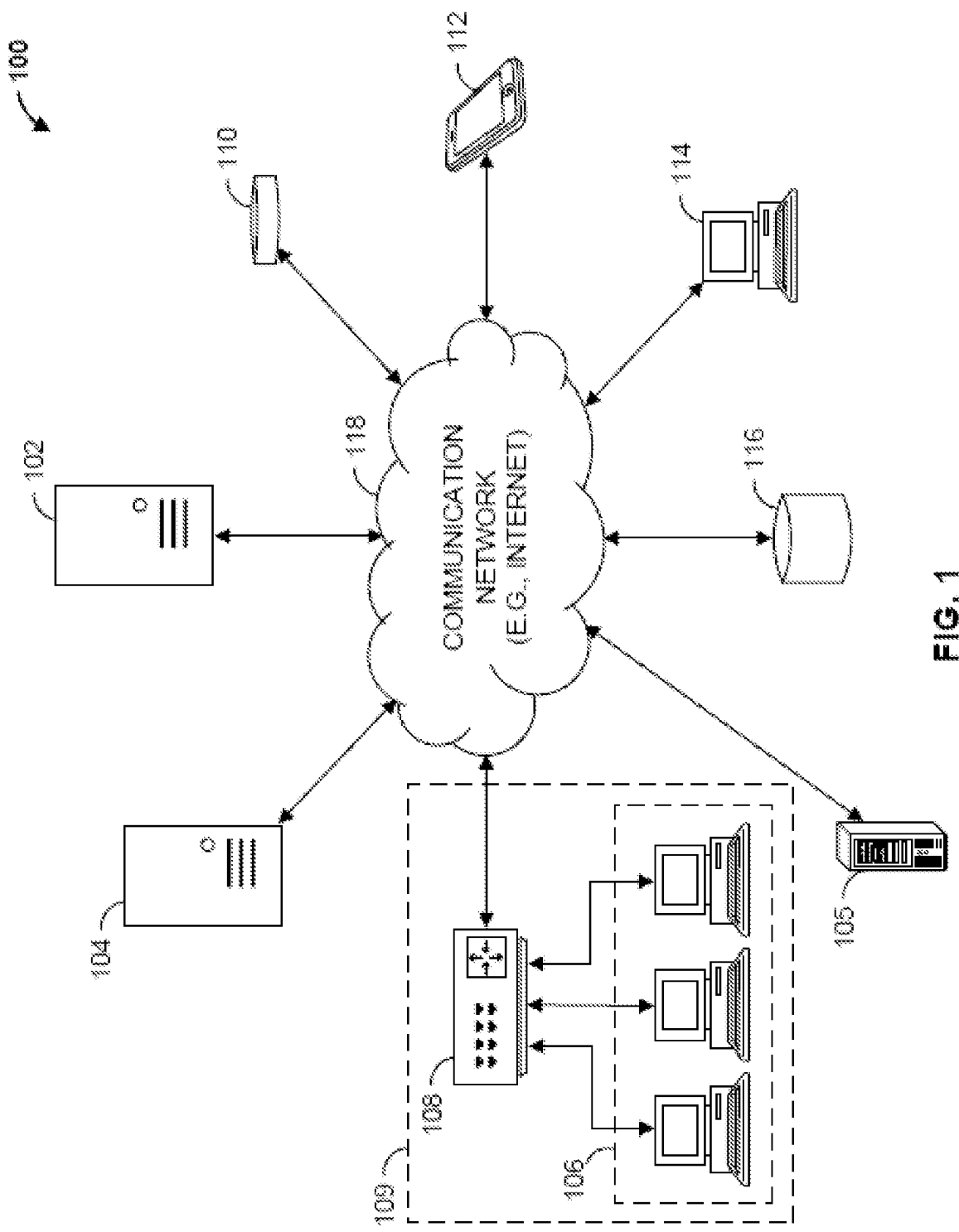
FIG. 1 is a block diagram of an exemplary communication system used to provide search results, in accordance with some embodiments of the present teaching.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an exemplary communication system 100 that includes a search result computing device 102 (e.g., a server, such as an application server), a web server 104, workstation(s) 106, a database 116, a weighting model training system 105, and multiple customer computing devices 110, 112, 114 operatively coupled over a communication network 118. The search result computing device 102, workstation(s) 106, the server 104, the weighting model training system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, the communication network 118.

In some examples, the search result computing device 102 can be a computer, a workstation, a laptop, a server such as a cloud-based server, or any other suitable device. In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the search result computing device 102 is operated by a retailer, and the multiple customer computing devices 112, 114 are operated by customers of the retailer.

Although FIG. 1 illustrates three customer computing devices 110, 112, 114, the communication system 100 can include any number of customer computing devices 110, 112, 114. Similarly, the communication system 100 can include any number of workstation(s) 106, search result computing devices 102, web servers 104, weighting model training systems 105, and databases 116.

The workstation(s) 106 are operably coupled to the communication network 118 via a router (or switch) 108. In some embodiments, the workstation(s) 106 and/or router 108 may be located at a store 109, e.g. a store of multiple physical retail stores of a retailer which may also have online retail services. The workstation(s) 106 can communicate with the search result computing device 102 over the communication network 118. The workstation(s) 106 may send data to, and receive data from, the search result computing device 102. For example, the workstation(s) 106 may transmit purchase data related to orders purchased by customers at the store 109 to the search result computing device 102. In some examples, the search result computing device 102 may transmit, in response to received purchase data, an indication of one or more item advertisements to provide to a customer. For example, the item advertisements may be displayed on a receipt handed to the customer for the purchase order.

In some examples, the web server 104 hosts one or more web pages, such as a retailer's website. The website may allow for the purchase of items. The web server 104 may transmit purchase data related to orders purchased on the web site by customers to the search result computing device 102. In some examples, the web server 104 transmits user session data to the search result computing device 102. The user session data identifies events associated with browsing sessions. The web server 104 may also transmit a search request to the search result computing device 102. The search request may identify a search query provided by a customer. In response to the search request, the search result computing device 102 may generate a search result comprising a plurality of items that match the search query to the purchasing customer, such as by displaying the items on a search result webpage.

The first customer computing device 110, second customer computing device 112, and N$^{th}$ customer computing device 114 may communicate with the web server 104 over the communication network 118. For example, each of the multiple computing devices 110, 112, 114 may be operable to view, access, and interact with the website hosted by the web server 104. In some examples, the website allows a customer to search for items via, for example, a search bar. A customer operating one of the multiple computing devices 110, 112, 114 may access the website via an executed browsing application and perform a search for items on the website by entering in one or more terms into the search bar. In response, the web site may return search results identifying one or more items. The website may further allow the customer to add one or more of the items received in the search results to an online shopping cart, and allow the customer to perform a "checkout" of the shopping cart to purchase the items.

In other examples, one or more of the multiple computing devices 110, 112, 114 may be installed with a mobile app associated with a retailer, wherein the mobile app is served by the search result computing device 102 and/or the web server 104. A user or customer may perform a search for items on the mobile app by entering in one or more terms into a search bar of the mobile app. In response, the mobile app may return a search result identifying one or more items. The mobile app may further provide in-store information related to each item in the search result, e.g. location information of the item in a user-selected store of the retailer, available quantity of the item in the store, price of the item in the store, etc., which allows the customer to have the relevant information to determine whether to go to the store for purchasing the item and/or where to identify the item in the store.

The search result computing device 102 is operable to communicate with the database 116 over the communication network 118. For example, the search result computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the search result computing device 102, in some examples, the database 116 can be a local storage device, such as a hard drive, a non-volatile memory, or a USB stick of the search result computing device 102. The search result computing device 102 may store purchase data received from the store 109 and/or the web server 104 in the database 116. The search result computing device 102 may also store user session data identifying events associated with browsing sessions, such as when a customer browses a website hosted by the web server 104, in the database 116. In some examples, the database 116 stores one or more machine learning models that, when executed by the search result computing device 102, allow the search result computing device 102 to determine one or more search results, such as items, in response to a search query. In some examples, the database 116 stores historical data of a user related to searching, e.g. previous search quires submitted by the user, product items purchased by the user after a search, intention terms or features identified for a query of the user and confirmed by a purchase of the user, etc.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

In some embodiments, the search result computing device 102 can use trained machine learning models (e.g., algorithms) to generate ranking values that rank items in a search result for a given search query. A first item with a comparatively higher ranking than a second item may indicate that the first item is more relevant to a corresponding search query than the second item, e.g. more relevant to a primary intent extracted from the search query than the second item. The search result computing device 102 may apply the trained machine learning models to queries to generate ranking values for items corresponding to each query. For example, after a user submits a query, through a website hosted by the web server 104 or a mobile app served by the web server 104, the web server 104 may transmit the search query to the search result computing device 102 and, in response, the search result computing device 102 may generate ranking values for one or more items based on applying a trained machine learning model to the search query. In some embodiments, the search result computing device 102 may directly serve the web site or the mobile app, to receive the search query from the user.

In some examples, the search result computing device 102 may obtain a trained weighting model from a model training system, such as the weighting model training system 105. The weighting model training system 105 may be a third-party server that performs machine learning to train the weighting model for the search result computing device 102 or may be integrated with the search result computing device 102. In some examples, the search result computing device 102 may obtain a plurality of training queries each of which has a known primary intention term, and transmit the training queries with known primary intention terms to the weighting model training system 105 and, in response, receive a trained weighting model. The search result computing device 102 may determine a primary intent of a query based on the trained weighting model and generate search results based on the primary intent as described herein.

The search result computing device 102 may obtain queries from users associated with an online retailer, e.g. through the web server 104 or the search result computing device 102 itself, and generate online search results comprising items matching the queries. In one embodiment, the search result computing device 102 may receive, from a user, a search query including a plurality of words, and identify a plurality of intention terms from the words of the search query. The search result computing device 102 may then compute, for each of the plurality of intention terms, a compatibility score between the intention term and a query context associated with the intention term, to determine, from the plurality of intention terms, a primary intention term having a maximum compatibility score among the plurality of intention terms. The search result computing device 102 can then generate, based on the primary intention term, a set of intent-based search results in response to the search query. For example, the set of intent-based search results may identify a set of items associated with the primary intention term. The search result computing device 102 may store all these data related to search query and search results into the database 116.

When computing the compatibility scores, the search result computing device 102 will use attention weights to assign to different terms in the query context. The attention weights may be determined based on the weighting model trained by the weighting model training system 105. To train a machine learning model for term weighting, the search result computing device 102 may obtain, from the database 116, historical data that identify and characterize a plurality of training queries that were previously submitted by different users. Each training query has a known primary intention term which might be determined by a user's corresponding transaction after receiving the search results in response to the training query. The historical data may be aggregated based on corresponding time periods, such as for a day, a month, a quarter, or a year. In some embodiments, the historical data may also include user engagement data that identifies items a user has engaged (e.g., clicked, ordered, added to cart, etc.) after receiving search results for a search query the user provided via a website or mobile app.

Based on the aggregated historical data, the weighting model training system 105 may generate training features for training the weighting model. The training features may include positive sample pairs and negative sample pairs. For example, the weighting model training system 105 may generate, for each of the plurality of training queries, a positive sample pair based on the known primary intention term and its corresponding query context; and generate, for each of at least one of the plurality of training queries, a negative sample pair based on a randomly-chosen unrelated intention term and its corresponding query context. The weighting model training system 105 can train the weighting model based on machine learning and a minimization of a loss function associated with each of the plurality of training queries. The loss function may be computed based on: (a) a compatibility score between the known primary intention term and its corresponding query context from the positive sample pair of the training query, and (b) one or more compatibility scores each between the unrelated intention term and its corresponding query context from a respective negative sample pair of the training query.

Based on the training, the weighting model training system 105 may determine a weight for each term in the query context such that the loss function can be minimized. In some examples, the weighting model training system 105 stores the trained machine learning model within the database 116.

Figure 2:
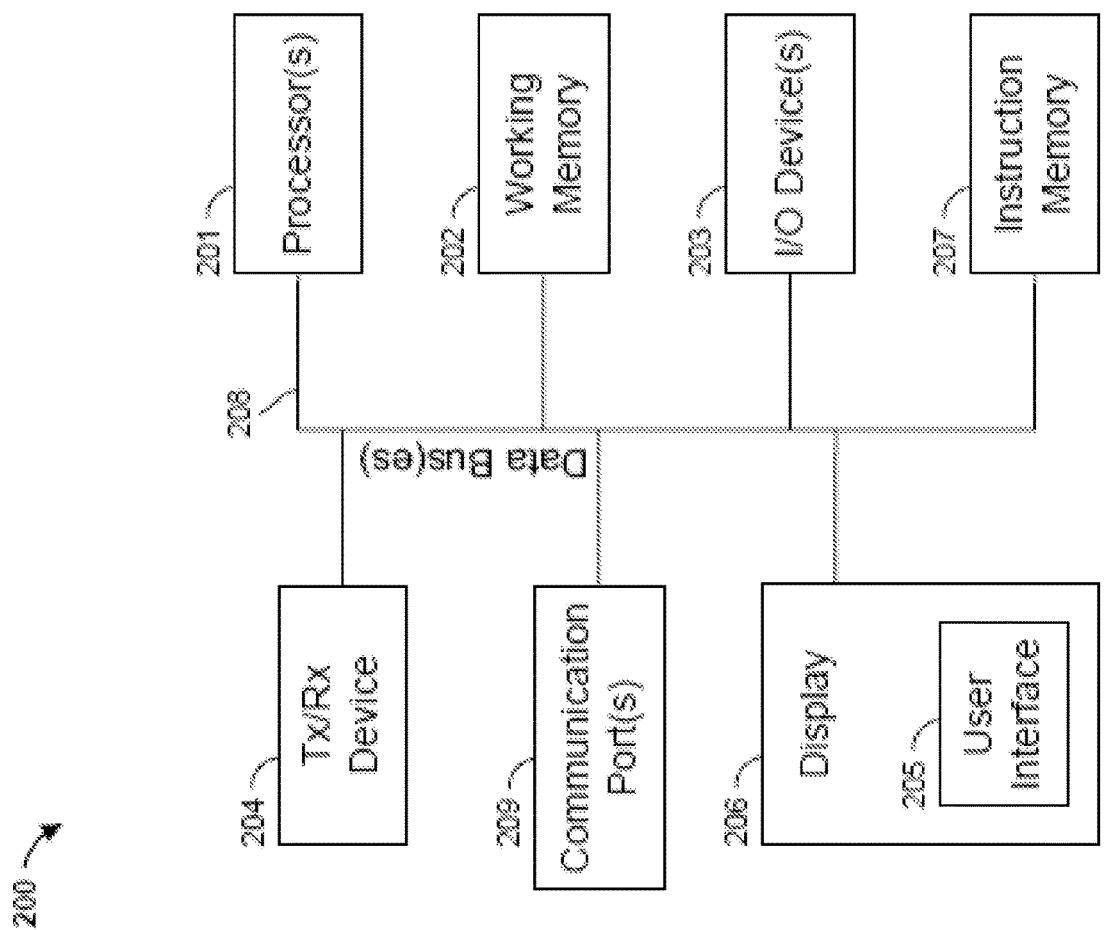
FIG. 2 is a block diagram of a computing device of the communication system of FIG. 1, in accordance with some embodiments of the present teaching.

FIG. 2 illustrates an example computing device 200. Any of the search result computing device 102, the web server 104, the weighting model training system 105, the workstation(s) 106, the multiple customer computing devices 110, 112, 114 may include the features shown in FIG. 2. For the sake of brevity, FIG. 2 is described relative to the search result computing device 102. It should be appreciated, however, that the elements described can be included, as applicable, in any of the web server 104, the weighting model training system 105, the workstation(s) 106, and the multiple customer computing devices 110, 112, 114, as well.

As shown in FIG. 2, the search result computing device 102 can be a computing device 200 that may include one or more processors 201, a working memory 202, one or more input/output devices 203, an instruction memory 207, a transceiver 204, one or more communication ports 209, and a display 206, all operatively coupled to one or more data buses 208. The data buses 208 allow for communication among the various devices. The data buses 208 can include wired, or wireless, communication channels.

The one or more processors 201 can include one or more distinct processors, each having one or more processing cores. Each of the distinct processors can have the same or different structures. The one or more processors 201 can include one or more central processing units (CPUs), one or more graphics processing units (GPUs), application specific integrated circuits (ASICs), digital signal processors (DSPs), and the like.

The one or more processors 201 can be configured to perform a certain function or operation by executing code, stored on the instruction memory 207, embodying the function or operation. For example, the one or more processors 201 can be configured to perform one or more of any function, method, or operation disclosed herein.

The instruction memory 207 can store instructions that can be accessed (e.g., read) and executed by the one or more processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

The one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during the operation of the asynchronous conversational computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning algorithm training data.

The display 206 can display a user interface 205. User interfaces 205 can enable user interaction with the asynchronous conversational computing device 102. In some examples, a user can interact with the user interface 205 by engaging input-output devices 203. In some examples, the display 206 can be a touchscreen, where the user interface 205 is displayed by the touchscreen.

The transceiver 204 allows for communication with a network, such as the communication network 118 of FIG. 1. For example, if the communication network 118 of FIG. 1 is a cellular network, the transceiver 204 may be configured to allow communications with the cellular network. In some examples, the transceiver 204 is selected based on the type of communication network 118 which the search result computing device 102 will be operating in. The processor(s) 201 is operable to receive data from, or send data to, a network, such as the communication network 118 of FIG. 1, via the transceiver 204.

Figure 3:
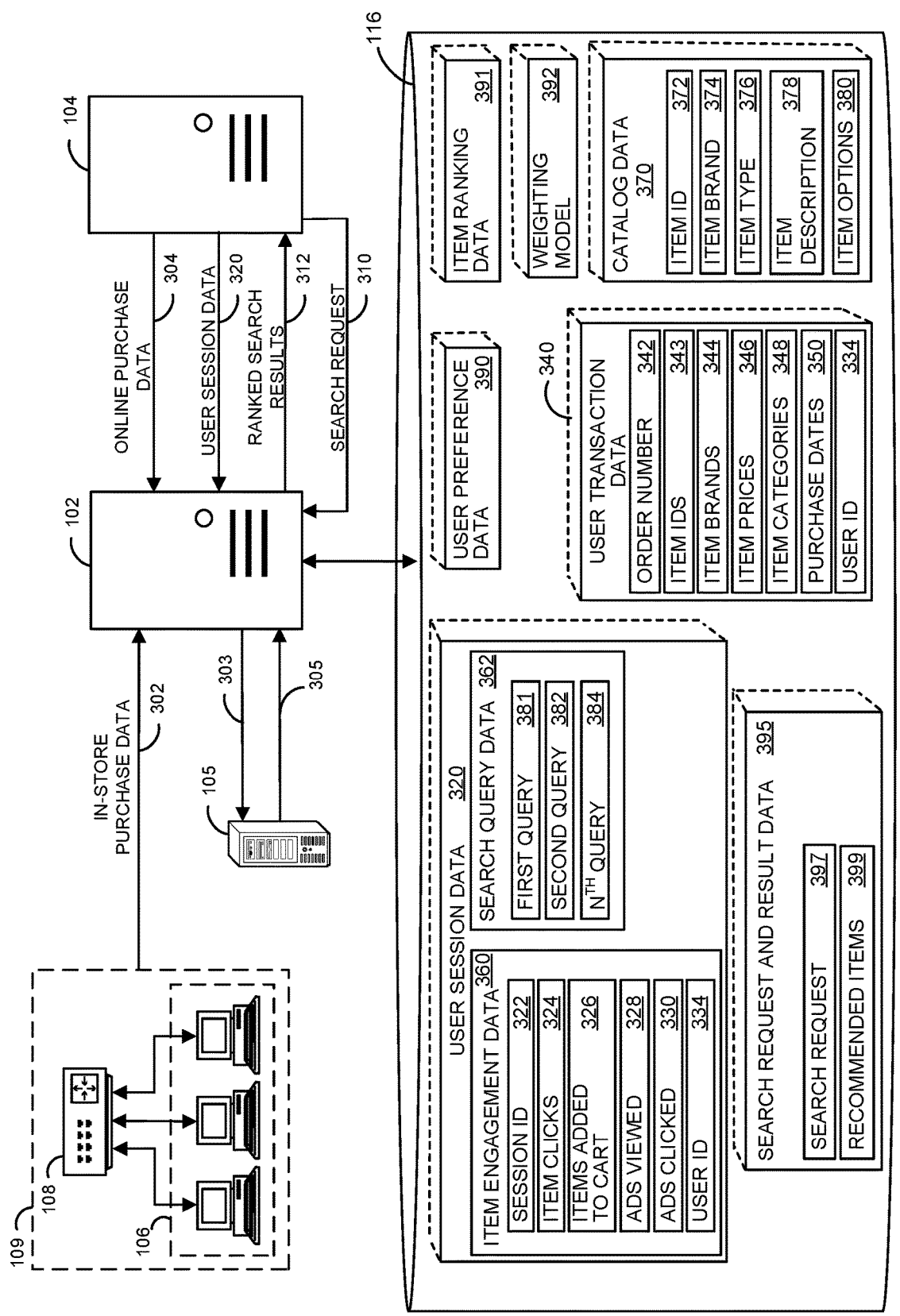
FIG. 3 is a block diagram illustrating examples of various portions of the communication system of FIG. 1, in accordance with some embodiments of the present teaching.

FIG. 3 is a block diagram illustrating examples of various portions of the communication system 100 of FIG. 1. As indicated in FIG. 3, the search result computing device 102 may receive user session data 320 from the web server 104, and store the user session data 320 in the database 116. The user session data 320 identifies, for each user, data related to a browsing session, such as when browsing a retailer's webpage or mobile app served by the web server 104. In this example, the user session data 320 includes item engagement data 360 and search query data 362. In some embodiments, the item engagement data 360 includes a session ID 322 (i.e., a website or mobile app browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 (e.g., a customer ID, retailer website login ID, etc.). In some embodiments, the search query data 362 identifies one or more searches conducted by a user during a browsing session (e.g., a current browsing session). In some embodiments, a query submitted by a user may be associated with a store, e.g. to search for items available at a specified retail store. In this example, the search query data 362 includes: a first query 381, a second query 382, and an $N^{th}$ query 384.

In some embodiments, the search result computing device 102 may also receive in-store purchase data 302 identifying and characterizing one or more purchases from one or more stores 109. Similarly, the search result computing device 102 may receive online purchase data 304 from the web server 104, which identifies and characterizes one or more online purchases, such as from a retailer's website or mobile app. In some embodiments, the search result computing device 102 may parse the in-store purchase data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and a user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

In some examples, the search result computing device 102 may receive a search request 310 identifying and characterizing a search query from a user. The search query may include data identifying and characterizing one or more words, for example. In some embodiments, the search query is obtained via at least one of: a website associated with an online retailer and visited by the user; or a mobile app that is associated with the online retailer and installed on a mobile device of the user. The search query may be in a format of natural language based on at least one of: a text input by the user; or a voice input by the user and a voice-to-text conversion app.

A search query may carry one or more intents of a user. To extract or identify a primary intent of the user, the search result computing device 102 may first identify all intention terms in the search query. For example, the search result computing device 102 can parse the search query into a plurality of parsed terms each of which may be a word or a phrase in the search query. The search result computing device 102 may determine product data, attribute data, and metadata from the parsed terms; and identify, from the parsed terms, each intention term based on at least one of: the product data, the attribute data, or the metadata. In one example, each intention term is identifying at least one of: a product, a product type, or a brand.

To further determine a primary intent among the multiple intents, or determine a primary intention term among the multiple intention terms in the search query, the search result computing device 102 may compute, for each of the multiple intention terms, a compatibility score between the intention term and the query context associated with the intention term. The query context associated with the intention term includes all words of the search query except the intention term itself. In some embodiments, the search result computing device 102 computes the compatibility scores based on a neural network and a pre-trained machine learning model, such as a weighting model 392 stored in the database 116.

In some examples, to train the machine learning model characterized by the weighting model 392, the search result computing device 102 generates training data based on historical search data of users who performed search during a time period before a current date, e.g. during the last one year or last one month. For example, a user may receive recommended items 399 in a search result after submitting a query. The historical search data generated for multiple users submitting multiple queries will include: a user ID (e.g. by referencing the user ID 334 in the user session data 320 of a user) for each user, an item ID (e.g. by cross referencing the item ID 372 in the catalog data 370 based on the recommended items 399) for each item of the recommended items 399 in response to a query, an item ID for each item purchased by a user after receiving the search results, and previously identified primary intention terms corresponding to the items purchased by the users.

In some examples, the search result computing device 102 transmits the training data within a training request message 303 to the weighting model training system 105. In response, the weighting model training system 105 trains or re-trains the weighting model 392 based on machine learning and training features extracted from the historical search data, and transmits the trained weighting model to the search result computing device 102 as a training response message 305. The training features may include positive samples based on previously identified primary intention terms and their corresponding query contexts, and negative samples based on randomly chosen unrelated (intention or non-intention) terms and their corresponding query contexts. As described herein, the weighting model training system 105 may train a machine learning model, such as one based on a neural network, based on the generated training features. Further, the weighting model training system 105 may store the trained machine learning model as the weighting model 392 within the database 116. In some embodiments, the weighting model training system 105 may be integrated into the search result computing device 102, or the search result computing device 102 itself can train the weighting model 392.

The search result computing device 102 may apply the weighting model 392 to a search query identified by the search request 310 to determine a primary intent of the query, and generate ranked search results 312 including one or more items matching the primary intent. The search result computing device 102 may transmit the ranked search results 312 to the web server 104, where the ranked search results 312 identifies a ranked set of recommended items. The web server 104 may then display the set of recommended items in response to the search query. In some embodiments, the recommended items in the search results 312 are ranked based on their relevance or matching levels to the primary intent or primary intention term in the search query. In some embodiments, the recommended items in the search results 312 may also be ranked in consideration of other intention terms in the search query, and/or the entire query context of the search query.

In some examples, the recommended items in the search results 312 are personalized items recommended to the user. For example, after determining intent-based search results based on the primary intent of the user submitting the query, the search result computing device 102 may receive, e.g. from the database 116, historical data and user features of the user based on a user ID of the user. In some embodiments, the user may provide a user ID or customer ID to a website or a mobile app. The user ID may be associated with: a login name of the user, credit card information saved by the mobile app in association with the user, or a payment app (e.g. Walmart Pay, Apple Pay, Google Pay, PayPal, etc.) that is associated with the user and saved by the mobile app. Based on the historical data and/or the user features of the user, the search result computing device 102 may generate, from the set of intent-based search results, a set of personalized search results associated with the search query as the recommended items in the search results 312.

The user features may include user preference data 390 (e.g., a website profile) for a customer or user based on attributes associated with that customer. For example, the user preference data may identify and characterize attributes associated with a customer during a browsing session of a website. In some examples, more than one attribute per attribute category (e.g., brand, type, description) may be identified. When generating user preference data for a user, the search result computing device 102 may determine, for each attribute category, an attribute that is identified most often (i.e., a majority attribute). The attribute defined most often in each attribute category is stored as part of that customer's user preference data. In some examples, a percentage score is generated for each attribute within an attribute category, and the percentage score is stored as part of the customer's user preference data. The percentage score is based on a number of times a particular attribute is identified in a corresponding attribute category with respect to the number of times any attribute is identified in that attribute category. In some examples, the search result computing device 102 stores the customers' user preference data 390 in the database 116.

In some examples, the search result computing device 102 stores the search query, and the corresponding item rankings, in the database 116 as the search request and result data 395. For example, the search result computing device 102 may store the search query as the search request 397, and may store data identifying the ranked items in the search result as the recommended items 399. In some examples, the search result computing device 102 stores the generated ranking values within the database 116 as the item ranking data 391.

Figure 4:
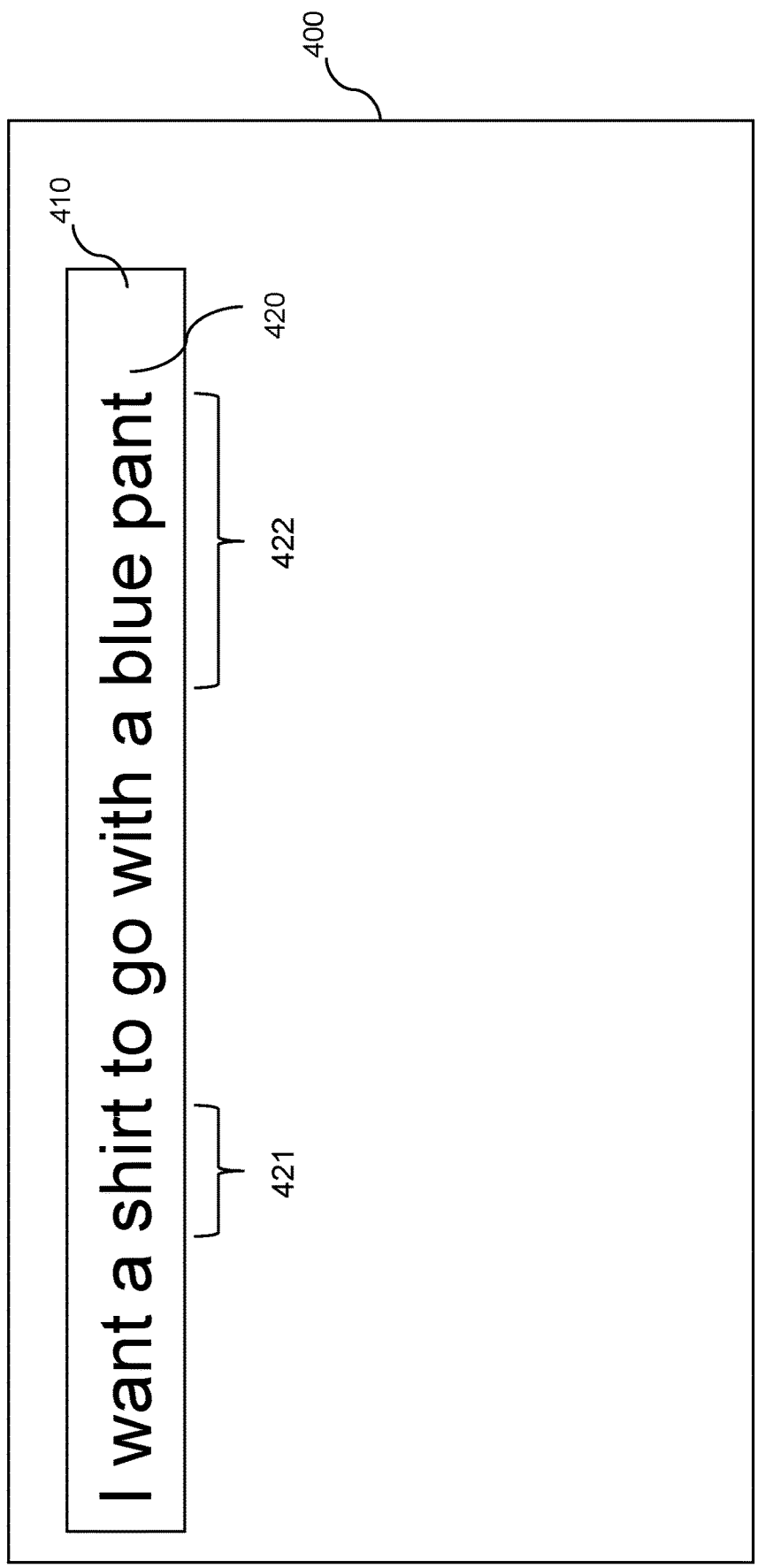
FIG. 4 illustrates an example of a user's search query including multiple intention terms, in accordance with some embodiments of the present teaching.

FIG. 4 illustrates an example of a user's search query including multiple intention terms, in accordance with some embodiments of the present teaching. As shown in FIG. 4, a search query 420 is submitted via a search bar 410 of a graphical user interface (GUI) 400. The GUI 400 may be provided by a website associated with an online retailer and visited by the user; or by a mobile app that is associated with the online retailer and installed on a mobile device of the user. In this example, the search query 420 includes a natural language sentence: "I want a shirt to go with a blue pant." In this case, a search system or device, e.g. the search result computing device 102, may extract two intention terms: "shirt" 421 and "blue pant" 422. Each of these intention terms can identify a product or product type. To further determine a primary intention term among the two intention terms 421, 422, the system may compute, for each of the two intention terms 421, 422, a compatibility score between the intention term and the query context associated with the intention term.

In the example shown in FIG. 4, the system may compute a first compatibility score between the intention term "shirt" 421 and its query context "I want a . . . to go with a blue pant;" and compute a second compatibility score between the intention term "blue pant" 422 and its query context "I want a shirt to go with a . . . ." Each of the first compatibility score and the second compatibility score may be computed based on a weighting model pre-trained based on user historical search data with known primary intents. Then the system can compare the two compatibility scores and determine which one of the two intention terms 421, 422 is the primary intention term. In this case, the system may determine the "shirt" 421 is the primary intention term as it has a higher compatibility score. The system then generates search results including product items matching the primary intention term "shirt" 421, where items and/or ranking of the items in the search results may be based on the query context of the "shirt" 421, e.g. based on the other intention term "blue pant" 422.

Figure 5:
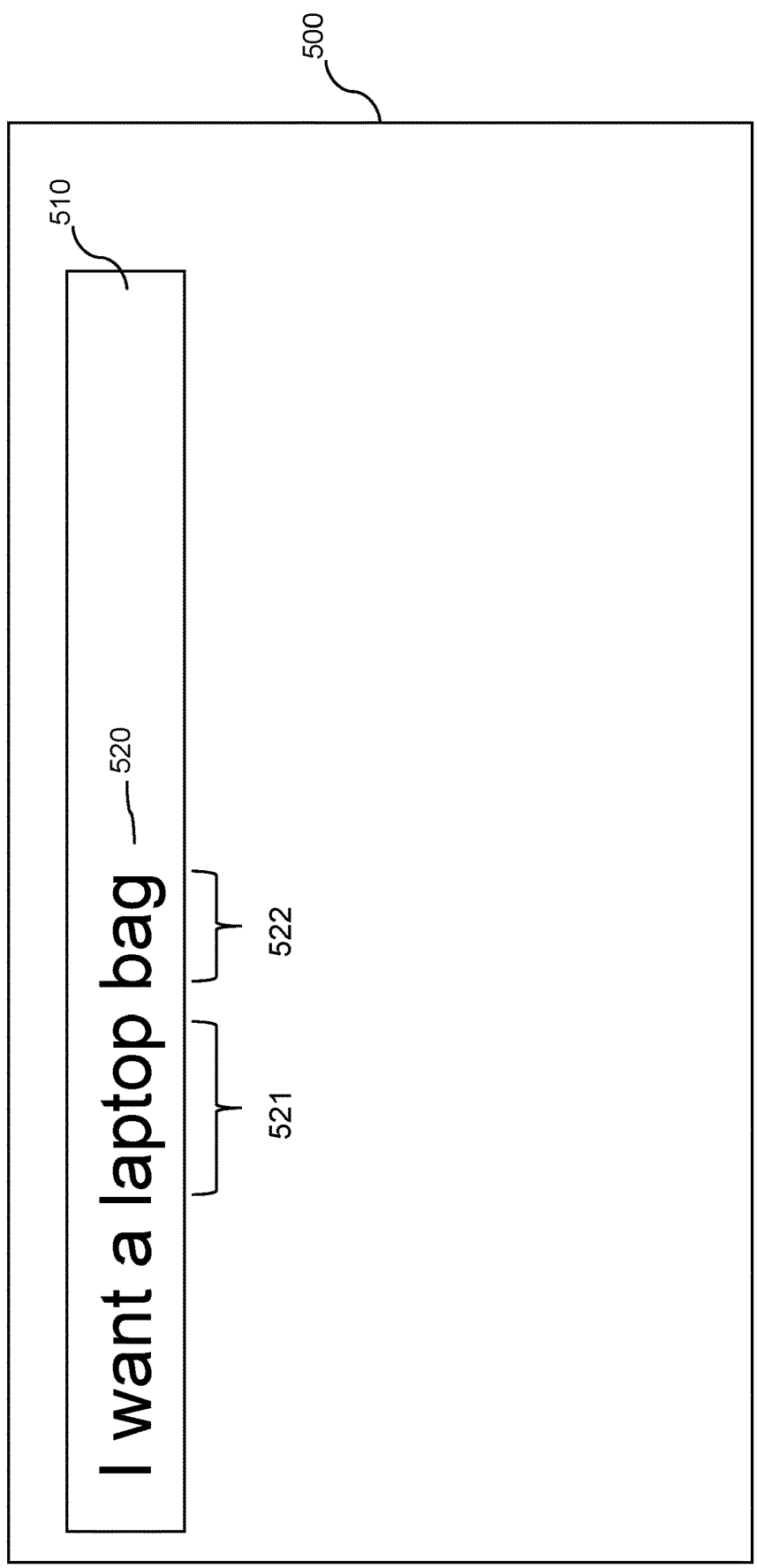
FIG. 5 illustrates another example of a user's search query including multiple intention terms, in accordance with some embodiments of the present teaching.

FIG. 5 illustrates another example of a user's search query including multiple intention terms, in accordance with some embodiments of the present teaching. As shown in FIG. 5, a search query 520 is submitted via a search bar 510 of a GUI 500. The GUI 500 may be provided by a website associated with an online retailer and visited by the user; or by a mobile app that is associated with the online retailer and installed on a mobile device of the user. In this example, the search query 520 includes a natural language sentence: "I want a laptop bag." In this case, a search system or device, e.g. the search result computing device 102, may extract two intention terms: "laptop" 521 and "bag" 522. Each of these intention terms can identify a product or product type. To further determine a primary intention term among the two intention terms 521, 522, the system may compute, for each of the two intention terms 521, 522, a compatibility score between the intention term and the query context associated with the intention term.

In the example shown in FIG. 5, the system may compute a third compatibility score between the intention term "laptop" 521 and its query context "I want a . . . bag;" and compute a fourth compatibility score between the intention term "bag" 522 and its query context "I want a laptop . . . ." Each of the third compatibility score and the fourth compatibility score may be computed based on a weighting model pre-trained based on user historical search data with known primary intents. Then the system can compare the two compatibility scores and determine which one of the two intention terms 521, 522 is the primary intention term. In this case, the system may determine the "bag" 522 is the primary intention term as it has a higher compatibility score. The system then generates search results including product items matching the primary intention term "bag" 522, where items and/or ranking of the items in the search results may be based on the query context of the "bag" 522, e.g. based on the other intention term "laptop" 521.

There may be other methods to determine a primary intent from multiple intents of a search query. For example, a system may always choose the first intent from the multiple intents identified. But choosing the first intent would not work for cases like: "laptop bag," where the second intent "bag" is the primary intent in the search query. In another example, a system may perform dependency parsing on the search query, and determine a primary intent based on an intention term having the most dependencies from the other intention terms.

Figure 6:
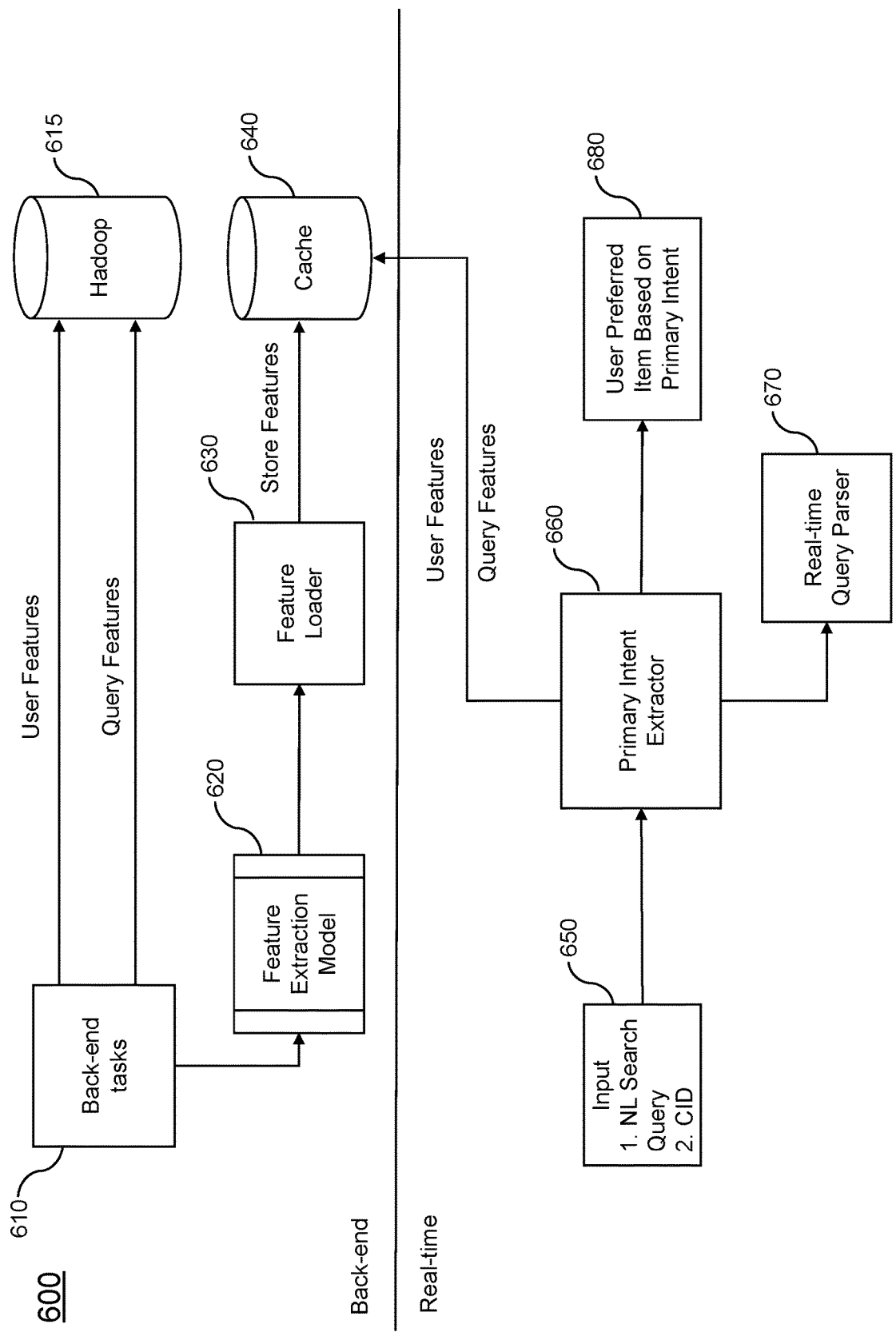
FIG. 6 illustrates an exemplary diagram of a system architecture for providing search results based on primary intent, in accordance with some embodiments of the present teaching.

FIG. 6 illustrates an exemplary diagram of a system architecture 600 for providing search results based on primary intent, in accordance with some embodiments of the present teaching. As shown in FIG. 6, the system architecture 600 of a search system includes jobs performed at back end and in real-time. At the back end side, tasks 610 may be performed, e.g. in a distributed system, based on users' engagement data and transaction data during a time period, e.g. a year or a month. The users may be customers of a retailer, e.g. Walmart. The data may be collected from different channels, e.g. from Walmart.com and physical stores of Walmart.

Based on the back-end tasks 610, user features and query features may be extracted to store data related to top possible queries in a Hadoop database 615. In some embodiments, the Hadoop database 615 may be a permanent storage for long-term search and transaction data. For example, the Hadoop database 615 may store user features and query features extracted from users' search and transaction data happened during a past year. A user feature may include information related to a user, e.g. online engagement behavior, preferred store location, preferred purchase time, search related preference, and/or item purchase preference of the user. Query features may be independent of a particular user, and can cover features of most frequently searched queries by most users. The extracted and stored user features and query feature can help building user-query profiles, and help simplifying computation during real-time searching, when the search engine is providing search results in response to same or similar queries to these top frequent queries.

A feature loader 630 can extract user and query features based on a feature extraction model 620 from the back-end tasks 610, and store these features into a cache 640. The cache 640 may be a temporary storage for short-term search and transaction data, and may store models and features to be used for real-time searching. For example, the cache 640 may refresh its data every 30 days.

At the real-time side of the architecture 600, an input 650 may be received by a primary intent extractor 660, which may be part of the search result computing device 102 in FIG. 1, from a user to perform search on products or items of a retailer. The input 650 may include a natural language (NL) search query and a customer ID (CID) of the user. The primary intent extractor 660 can determine a primary intent of the search query, based on interactions with the cache 640 and/or a real-time query parser 670.

The primary intent extractor 660 may send a request to the cache 640 to obtain query features related to the natural language search query of the input 650. If there is no or not enough query feature available in the cache 640 related to the natural language search query, the primary intent extractor 660 may request the real-time query parser 670 to parse the natural language search query into a plurality of parsed terms, and request query features from the cache 640 based on each parsed term. The real-time query parser 670 may then extract all products, attributes and metadata from the query. In some embodiments, the parsed attributes from a given query may include: product, food form, type, allergens, product type, allergens not contained, global product type, dietary need, flavor, dietary method, brand, nutrient, quantity, restriction, size, restricted food, count, container type, unit, and modifiers. The primary intent extractor 660 may identify intention terms each corresponding to a product, a product type and/or a brand.

When there are multiple intention terms, the primary intent extractor 660 can determine one of them as a primary or central intention term, based on query features obtained from the cache 640. For example, the query features may include information about a weighting model that can assign weights to terms in a query context of each intention term. The primary intent extractor 660 may compute a compatibility score for each intention term with respect to its corresponding query context, and determine the primary intention term as the intention term having the highest compatibility score.

In some embodiments, an input search query may be a sequence of word terms represented by a vector: $q=(x1, x2, \ldots, xn)$. In case the primary intent extractor 660 identifies at least two intention terms, the primary intent extractor 660 can output only one intention term $xi$ as the primary intention, where the term $xi$ can be a word or a phrase. The other intention term(s) can modify the primary intention. As such, each search query has only one actual goal product the user is seeking.

In some embodiments, a query context associated with an intention term may include all terms left in the query after taking away the intention term. As such, the query context of the intention term $xi$ may be represented by a vector: $q_c=(x1, x2, \ldots x(i-1), x(i+1) \ldots xn)$. Based on $q_c$ and the intention term $q_i=xi$, the primary intent extractor 660 can generate a compatibility score $score(q_c, q_i)$ measuring the compatibility between $q_c$ and $q_i$. A detailed computation of the compatibility score will be described later referring to FIG. 7. After computing the compatibility scores for all intention terms, the primary intent extractor 660 can extract the primary intent based on the intention term having the highest or maximum compatibility score.

In some embodiments, the primary intent extractor 660 may also request user features from the cache 640 based on a user ID or customer ID of the input 650. The primary intent extractor 660 may use the user features to generate personalized or user preferred items 680 matching the primary intent, as a response to the search input 650.

Figure 7:
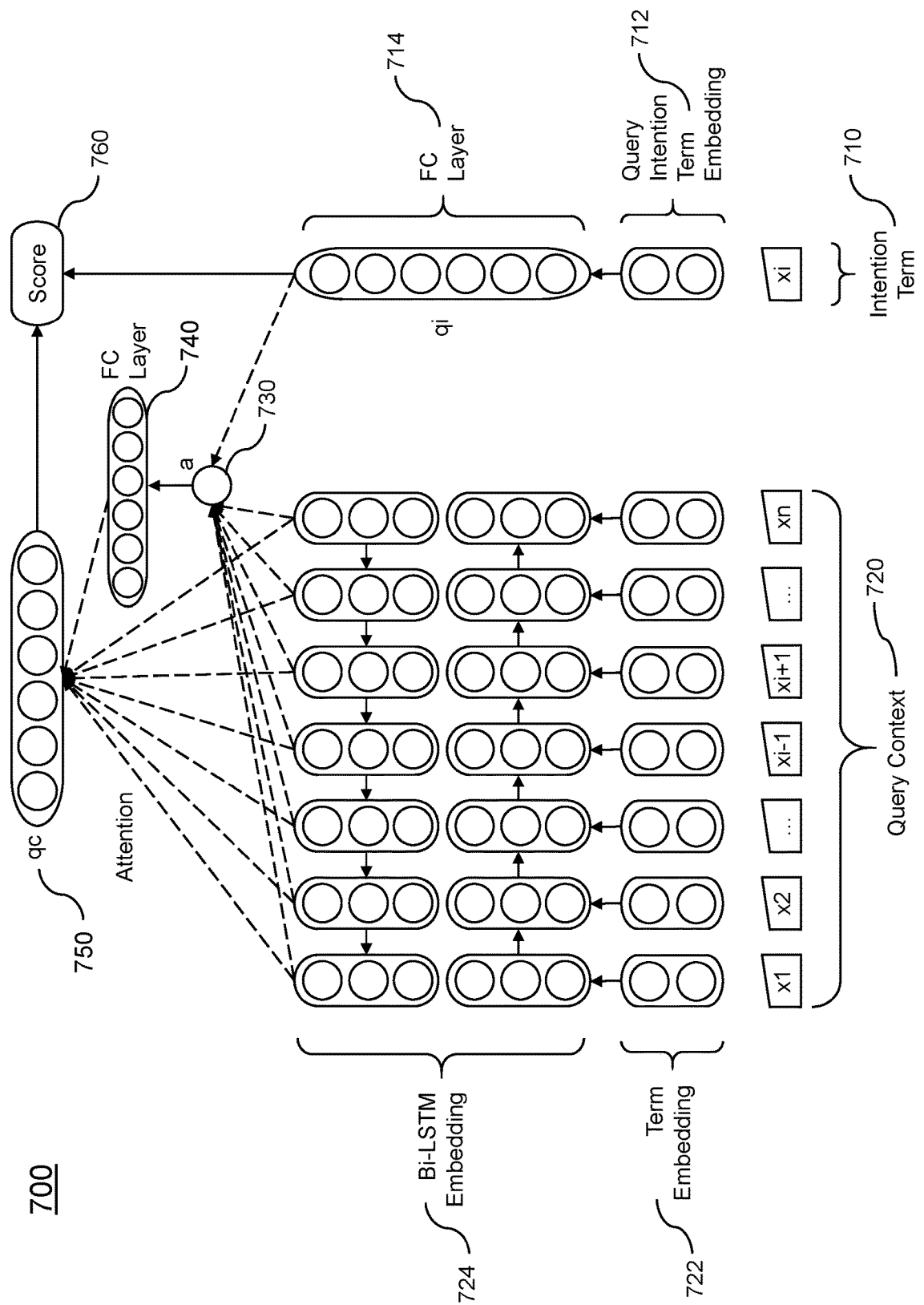
FIG. 7 illustrates an exemplary neural network configured to extract primary intent of a query or train weights for primary intent extraction, in accordance with some embodiments of the present teaching.

FIG. 7 illustrates an exemplary neural network 700 configured to extract primary intent of a query or train weights for primary intent extraction, in accordance with some embodiments of the present teaching. During a primary intent extraction phase of the system, one goal is to compute the compatibility between every query intention term and its corresponding query context, which includes terms in the query without the considered intention term, and to choose the intention term with the maximum compatibility score as the primary intention term representing a primary intent of the query.

To extract primary intent, the neural network 700 may be applied to each intention term and its query context to compute a compatibility score. As shown in FIG. 7, an intention term 710 and its query context 720 may be encoded separately. For example, the system may encode the considered intention term 710 by: obtaining a term embedding 712 for the intention term based on an encoder using bidirectional encoder representations from transformers (BERT); and feeding the term embedding 712 for the intention term to a fully-connected attention layer 714 in the neural network 700 to obtain an intention vector $q_i$.

In addition, the system may encode the query context 720 to obtain a context vector. The encoding of the query context 720 may include: obtaining term embedding's 722 for every term in the query context 720 based on a BERT encoder; feeding the term embedding's 722 for the query context 720 into a bidirectional long short-term memory (Bi-LSTM) 724 to capture dependencies in both directions of the words in the query context 720; concatenating the hidden layer representations from the forward and backward networks to obtain hidden representations H for every term in the query context 720; and feeding the hidden representations H to a fully-connected attention layer 740 with attention weights a 730 in the neural network 700 to obtain the final context vector $q_c$ 750, wherein the attention weights a 730 are determined based on a pre-trained weighting model.

In some embodiments, the attention weights for each term in the query can be represented by $$a_i = \frac{\exp(w_i)}{\sum_{i=1}^{n} \exp(w_i)},$$

where $$w_i = W_a^T(\tan h[H_i;qi]) + b$$

where $W_a$ is an intermediate matrix, and b is the bias/offset. These two parameters $W_a$ and b may be randomly initialized and updated during training. The final query context embedding with attention weights can be represented by the context vector $q_c$ 750 as:

$$qc = \sum_{i=1}^{n} a_i H_i.$$

The system may compute the compatibility score 760 between the query-intention vector $q_i$ and the query context vector $q_c$ based on a dot product of them as:

$$S(qc, qi) = qc \cdot qi$$

After computing all compatibility scores for all intention terms identified in a query, the system can choose the intention term with the maximum compatibility score with respect to its corresponding query context as the primary intention.

During a weight model training phase of the system, a loss function may be used to train the weighting model, where the loss function is represented by:

$$loss = \sum_{qi' \in N} \max(0, 1 - score(qc, qi) + score(qc, qi')).$$

The system may obtain search queries with known primary intention terms. To train the weighting model, the system can use these search queries as training queries. After identifying the primary intention term, the system can use a pair of <query context, primary intention term> in each training query as a positive sample, corresponding to the (qc, qi) in the loss function. In addition, the system can randomly choose some unrelated intention terms in each training query, and generate, for each unrelated intention term qi', a pair of <query context, unrelated intention term> as a negative sample, corresponding to the (qc, qi') in the loss function.

By feeding each one of the positive and negative samples into the neural network 700, the system can use intention term qi as attention query to train the weighting model to determine attention weights a 730 for each context term differently, aiming to better justify compatibility scores between the considered intention term and its query context. For example, for each training query, after feeding the positive sample (based on a known primary intention term) and the negative samples (based on randomly chosen unrelated intention terms) into the neural network 700, the system can compute compatibility scores for the positive and negative samples, based on different possible attention weights; and compute a corresponding loss function value based on the computed compatibility scores. The attention weights may be chosen or determined from all possible attention weights, such that the loss function value can be minimized. In this manner, when considering an intention term, the system re-reads the query to find out which part of the query should be more focused by handling attention weights. The determined attention weights together with the corresponding training query can be stored as part of the weighting model to be used during the primary intent extraction phase of the system.

Figure 8:
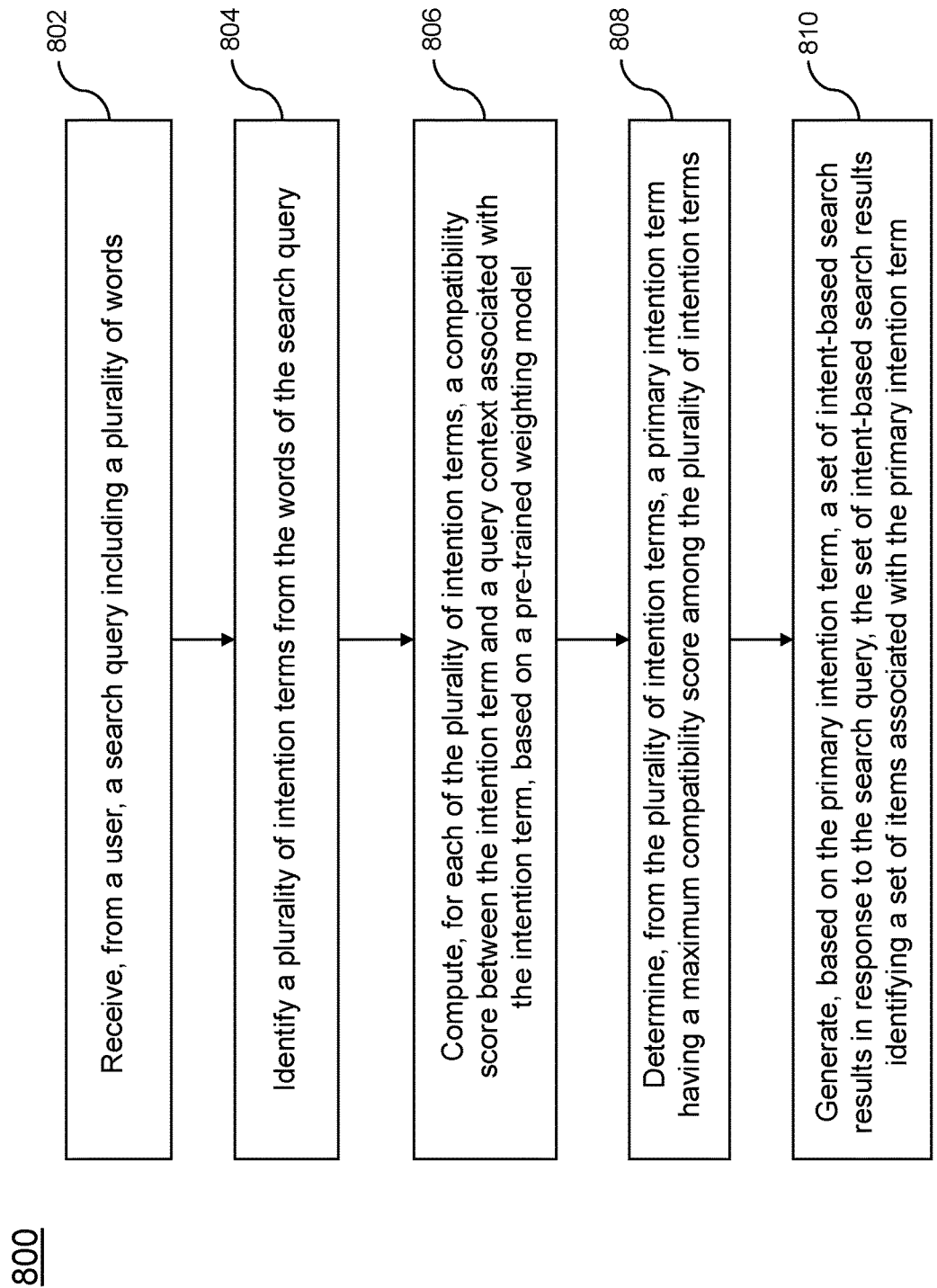
FIG. 8 is a flowchart of an exemplary method for providing search results, in accordance with some embodiments of the present teaching.

FIG. 8 is a flowchart of an exemplary method 800, which can be carried out by any computing device, e.g. the search result computing device 102 of FIG. 1, for providing search results, in accordance with some embodiments of the present teaching. At operation 802, the search result computing device 102 may receive, from a user, a search query including a plurality of words. At operation 804, the search result computing device 102 may identify a plurality of intention terms from the words of the search query. At operation 806, the search result computing device 102 may compute, for each of the plurality of intention terms, a compatibility score between the intention term and a query context associated with the intention term, based on a pre-trained weighting model. At operation 808, the search result computing device 102 may determine, from the plurality of intention terms, a primary intention term having a maximum compatibility score among the plurality of intention terms. At operation 810, the search result computing device 102 may generate, based on the primary intention term, a set of intent-based search results in response to the search query, wherein the set of intent-based search results can identify a set of items associated with the primary intention term. The order of the operations in FIG. 8 can be changed according to different embodiments of the present teaching.

Figure 9:
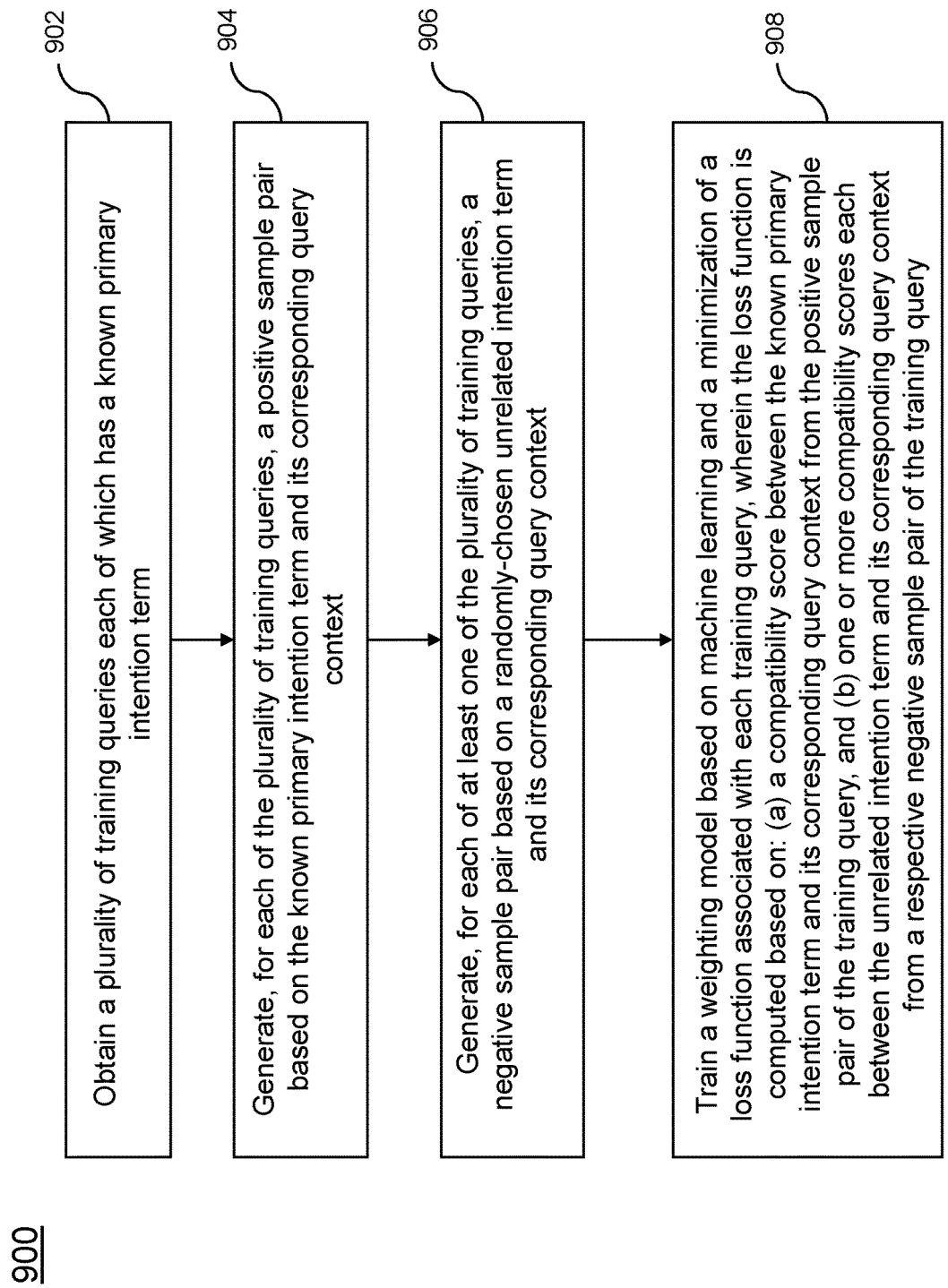
FIG. 9 is a flowchart of an exemplary method for training a weighting model for primary intent extraction, in accordance with some embodiments of the present teaching.

FIG. 9 is a flowchart of an exemplary method 900, which can be carried out by any computing device, e.g. the weighting model training system 105 or the search result computing device 102 of FIG. 1, for training a weighting model for primary intent extraction, in accordance with some embodiments of the present teaching. At operation 902, a plurality of training queries is obtained, where each training query has a known primary intention term. At operation 904, for each of the plurality of training queries, a positive sample pair is generated based on the known primary intention term and its corresponding query context. At operation 906, for each of at least one of the plurality of training queries, a negative sample pair is generated based on a randomly-chosen unrelated intention term and its corresponding query context. At operation 908, a weighting model is trained based on machine learning and a minimization of a loss function associated with each training query, wherein the loss function is computed based on: (a) a compatibility score between the known primary intention term and its corresponding query context from the positive sample pair of the training query, and (b) one or more compatibility scores each between the unrelated intention term and its corresponding query context from a respective negative sample pair of the training query. The order of the operations in FIG. 9 can be changed according to different embodiments of the present teaching.

As discussed above, the present teaching discloses a new and interesting topic when e-commerce search meets natural language queries with multiple intention terms. The disclosed system can identify the primary intention of a query so that the search engines can better understand query. The disclosed system utilizes a neural network with bi-LSTM and attention mechanism to effectively capture the rich semantic relatedness between context words and the intention term in the query. This attention mechanism can improve performance of the system, which can better understand the query with the help of the intention term by identifying the primary intention based on the attention mechanism.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system for providing search results, comprising:
    a memory resource storing instructions; and
    one or more processors coupled to the memory resource, the one or more processors being configured to execute the instructions to:
        receive, from a user, a search query including a plurality of words;
        identify a plurality of intention terms from the plurality of words of the search query;
        for each intention term in the plurality of intention terms, remove the intention term from the search query to generate a query context comprising the plurality of words without the intention term;
        determine, for each intention term in the plurality of intention terms, a compatibility score between the intention term and the query context associated with the intention term;
        determine, from the plurality of intention terms, a primary intention term having a maximum compatibility score among the plurality of intention terms;
        generate, based on the primary intention term, a set of intent-based search results in response to the search query, the set of intent-based search results identifying a set of items associated with the primary intention term;
        generate, based on the primary intention term, a ranking value for each item of the set of items;
        combine each item of the set of items with its corresponding ranking value to generate a ranked set of items, the ranked set of items including items ranked based on the corresponding ranking value; and
        display, in response to the search query, the ranked set of items.

2. The system of claim 1, wherein the search query is obtained via at least one of:
    a website associated with an online retailer and visited by the user; or
    a mobile app that is associated with the online retailer and installed on a mobile device of the user.

3. The system of claim 1, wherein the search query is in a format of natural language based on at least one of:
    a text input by the user; or
    a voice input by the user and a voice-to-text conversion app.

4. The system of claim 1, wherein identifying the plurality of intention terms comprises:
    parsing the search query into a plurality of parsed terms each of which being a word or a phrase of the search query; and
    determining product data, attribute data, and metadata from the parsed terms; and
    identifying, from the parsed terms, each of the plurality of intention terms based on at least one of: the product data, the attribute data, or the metadata.

5. The system of claim 4, wherein each of the plurality of intention terms is identifying at least one of: a product, a product type, or a brand.

6. The system of claim 1, wherein computing, for each of the plurality of intention terms, the compatibility score between the intention term and the query context associated with the intention term comprises:
    encoding the intention term to obtain an intention vector;
    encoding the query context to obtain a context vector; and
    computing the compatibility score based on a dot product of the context vector and the intention vector.

7. The system of claim 6, wherein encoding the intention term comprises:
    obtaining a term embedding for the intention term based on an encoder using bidirectional encoder representations from transformers (BERT); and
    feeding the term embedding for the intention term to a fully-connected layer in a neural network to obtain the intention vector.

8. The system of claim 7, wherein encoding the query context comprises:
    obtaining term embedding's for every term in the query context based on an encoder using BERT;
    feeding the term embedding's for the query context into a bidirectional long short-term memory (Bi-LSTM) to obtain hidden representations for every term in the query context; and
    feeding the hidden representations to a fully-connected layer with attention weights in the neural network to obtain the context vector, wherein the attention weights are determined based on a pre-trained weighting model.

9. The system of claim 8, wherein the one or more processors are further configured to execute the instructions to:
- obtain a plurality of training queries each of which has a known primary intention term; generate, for each of the plurality of training queries, a positive sample pair based on the known primary intention term and its corresponding query context;
- generate, for each of at least one of the plurality of training queries, a negative sample pair based on a randomly-chosen unrelated intention term and its corresponding query context; and
- train the weighting model based on machine learning and a minimization of a loss function associated with each of the plurality of training queries, wherein the loss function is computed based on: (a) a compatibility score between the known primary intention term and its corresponding query context from the positive sample pair of the training query, and (b) one or more compatibility scores each between the unrelated intention term and its corresponding query context from a respective negative sample pair of the training query.

10. The system of claim 1, wherein the one or more processors are further configured to execute the instructions to:
- receive, from a database, historical data and user features of the user based on a user identification (ID) of the user; and
- generate, from the set of intent-based search results, a set of personalized search results associated with the search query based on at least one of: the historical data or the user features of the user.

11. A method for providing search results, comprising:
receiving, from a user, a search query including a plurality of words; identifying a plurality of intention terms from the words of the search query;
for each intention term in the plurality of intention terms, removing the intention term from the search query to generate a query context comprising the plurality of words without the intention term;
determining, for each intention term in the plurality of intention terms, a compatibility score between the intention term and the query context associated with the intention term;
determining, from the plurality of intention terms, a primary intention term having a maximum compatibility score among the plurality of intention terms;
generating, based on the primary intention term, a set of intent-based search results in response to the search query, the set of intent-based search results identifying a set of items associated with the primary intention term;
generating, based on the primary intention term, a ranking value for each item of the set of items;
combining each item of the set of items with its corresponding ranking value to generate a ranked set of items, the ranked set of items including items ranked based on the corresponding ranking value; and
displaying, in response to the search query, the ranked set of items.

12. The method of claim 11, wherein:
the search query is obtained via at least one of:
- a website associated with an online retailer and visited by the user, or
- a mobile app that is associated with the online retailer and installed on a mobile device of the user; and the search query is in a format of natural language based on at least one of:
- a text input by the user, or
- a voice input by the user and a voice-to-text conversion app.

13. The method of claim 11, wherein identifying the plurality of intention terms comprises:
- parsing the search query into a plurality of parsed terms each of which being a word or a phrase of the search query;
- determining product data, attribute data, and metadata from the parsed terms; and
- identifying, from the parsed terms, each of the plurality of intention terms based on at least one of;
- the product data, the attribute data, or the metadata.

14. The method of claim 13, wherein each of the plurality of intention terms is identifying at least one of a product, a product type, or a brand.

15. The method of claim 11, wherein computing, for each of the plurality of intention terms, the compatibility score between the intention term and the query context associated with the intention term comprises:
- encoding the intention term to obtain an intention vector;
- encoding the query context to obtain a context vector; and
- computing the compatibility score based on a dot product of the context vector and the intention vector.

16. The method of claim 15, wherein encoding the intention term comprises:
- obtaining a term embedding for the intention term based on an encoder using bidirectional encoder representations from transformers (BERT); and
- feeding the term embedding for the intention term to a fully-connected layer in a neural network to obtain the intention vector.

17. The method of claim 16, wherein encoding the query context comprises:
- obtaining term embedding's for every term in the query context based on an encoder using BERT;
- feeding the term embedding's for the query context into a bidirectional long short-term memory (Bi-LSTM) to obtain hidden representations for every term in the query context; and
- feeding the hidden representations to a fully-connected layer with attention weights in the neural network to obtain the context vector, wherein the attention weights are determined based on a pre-trained weighting model.

18. The method of claim 17, further comprising:
- obtaining a plurality of training queries each of which has a known primary intention term;
- generating, for each of the plurality of training queries, a positive sample pair based on the known primary intention term and its corresponding query context;
- generating, for each of at least one of the plurality of training queries, a negative sample pair based on a randomly-chosen unrelated intention term and its corresponding query context; and
- training the weighting model based on machine learning and a minimization of a loss function associated with each of the plurality of training queries, wherein the loss function is computed based on: (a) a compatibility score between the known primary intention term and its corresponding query context from the positive sample pair of the training query, and (b) one or more compatibility scores each between the unrelated intention term and its corresponding query context from a respective negative sample pair of the training query.

19. The method of claim 11, further comprising:
receiving historical data and user features of the user based on a user identification (ID) of the user; and
generating, from the set of intent-based search results, a set of personalized search results associated with the search query based on at least one of: the historical data or the user features of the user.

20. A non-transitory computer readable medium having instructions stored thereon, wherein the instructions, when executed by at least one processor, cause a device to perform operations comprising:
receiving, from a user, a search query including a plurality of words; identifying a plurality of intention terms from the words of the search query;
for each intention term in the plurality of intention terms, removing the intention term from the search query to generate a query context comprising the plurality of words without the intention term;
determining, for each intention term in the plurality of intention terms, a compatibility score between the intention term and the query context associated with the intention term;
determining, from the plurality of intention terms, a primary intention term having a maximum compatibility score among the plurality of intention terms;
generating, based on the primary intention term, a set of intent-based search results in response to the search query, the set of intent-based search results identifying a set of items associated with the primary intention term;
generating, based on the primary intention term, a ranking value for each item of the set of items;
combining each item of the set of items with its corresponding ranking value to generate a ranked set of items, the ranked set of items including items ranked based on the corresponding ranking value; and
displaying, in response to the search query, the ranked set of items.

* * * * *